Dec. 26, 1967 L. C. PRICE, JR 3,359,891

SIDE LINE BOTTOM CODER

Filed Aug. 22, 1966 7 Sheets-Sheet 1

INVENTOR
LEWIS C. PRICE JR.
BY
Kenyon & Kenyon
ATTORNEYS

INVENTOR
LEWIS C. PRICE JR.
BY Kenyon + Kenyon
ATTORNEY

INVENTOR
LEWIS C PRICE JR.
BY Kenyon & Kenyon
ATTORNEYS

SIDE LINE BOTTOM CODER

Filed Aug. 22, 1966 7 Sheets-Sheet 4

INVENTOR
LEWIS C. PRICE JR.
BY Kenyon & Kenyon
ATTORNEYS

Dec. 26, 1967 L. C. PRICE, JR 3,359,891
SIDE LINE BOTTOM CODER
Filed Aug. 22, 1966 7 Sheets-Sheet 5
FIG. 9
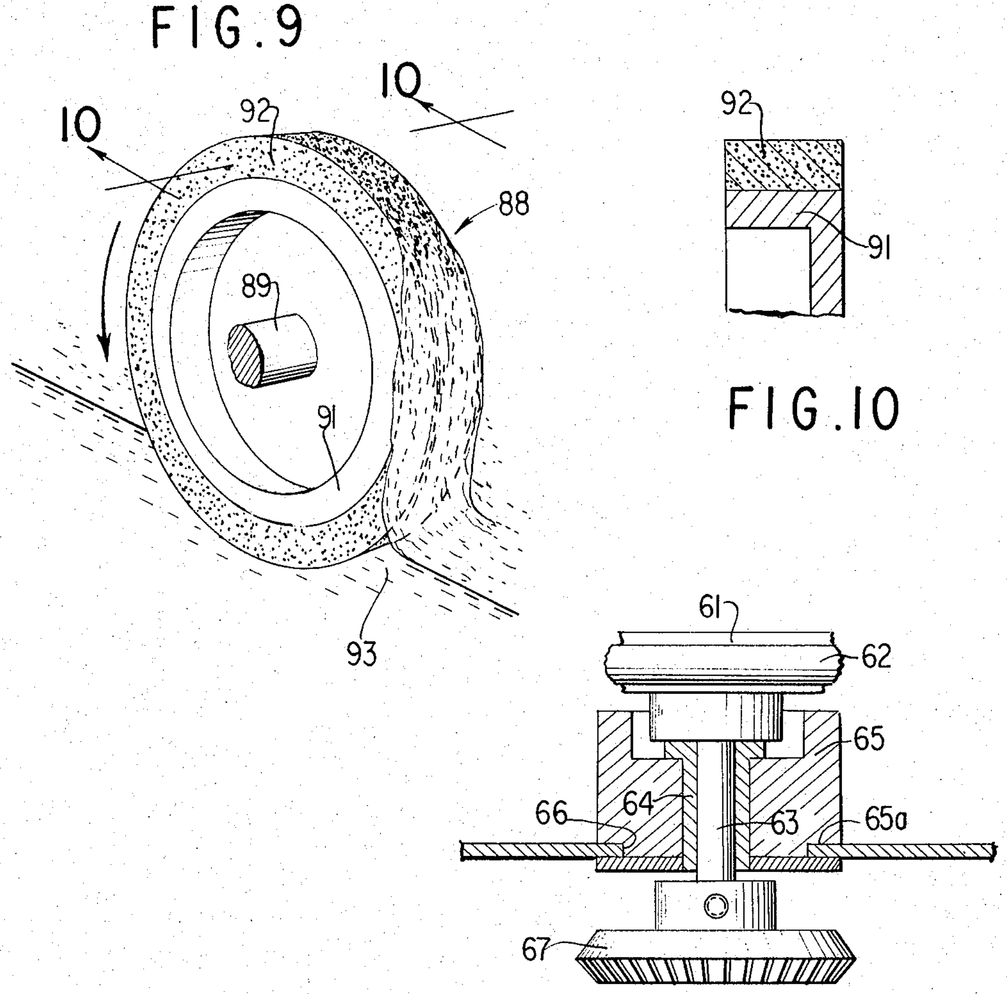
FIG. 9, FIG. 10, FIG. 11
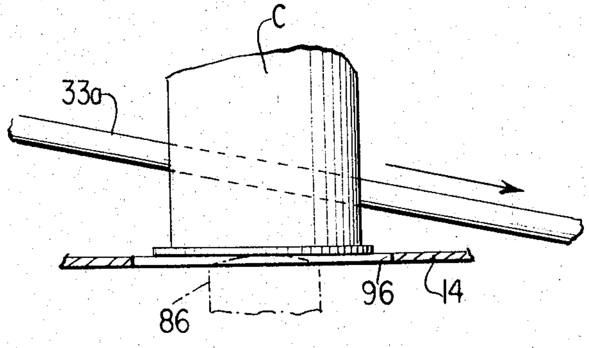
FIG. 12
INVENTOR
LEWIS C. PRICE JR.
BY Kenyon & Kenyon
ATTORNEYS INVENTOR
LEWIS C. PRICE JR.
BY Kenyon + Kenyon
ATTORNEYS INVENTOR
LEWIS C. PRICE JR.
BY Kenyon & Kenyon
ATTORNEYS

3,359,891
SIDE LINE BOTTOM CODER

Lewis C. Price, Jr., Yonkers, N.Y., assignor to Control Print Corporation, North Arlington, N.J., a corporation of New Jersey Filed Aug. 22, 1966, Ser. No. 574,160
13 Claims. (Cl. 101—35)

ABSTRACT OF THE DISCLOSURE

Apparatus for applying markings to container bottoms as the containers are moved along a conveyor including a table surface mountable along side the conveyor, guides for diverting containers from the conveyor over the table surface to a mark-applying position and for subsequently returning them to the conveyor, driven gripping means for gripping the diverted containers successively and for moving them positively toward and beyond the mark-applying position, a rotary mark applier at the mark-applying position to apply a mark to the bottom of each successive container operated cyclically and intermittently so that only one mark is applied to each successive container, the marker being driven at synchronous speed with the speed of movement of each successive container during application of a mark thereto.

This invention relates to a marking machine intended to apply code-markings or other indicia to bottoms of containers moving along a conveyor or any type of container conveying machinery being readily mountable alongside such conveyor in new or existing machinery.

The invention embraces a supporting frame readily mountable along side a conveyor of a container-treating machine including means for diverting successive containers from the conveyor and guiding and feeding them to and from a code-mark applying station and restoring them to the conveyor. At the said station code-markings are applied as by imprinting to either flat or concave bottom faces of the container, means being provided to ink the code-mark applying mechanism and to synchronize the surface speed of the container face and the mark-applying mechanism to avoid blurring and for insuring application of code-marks without repetition in the form of letters, numerals, words or the like, to each successive container, independent drive means for the marking machine of this invention being provided for effecting the desired code-marking, and means being provided to accommodate the machine to differently dimensioned and shaped containers.

Objects and features of this invention are the provision of a code-marking machine of the character described that is relatively inexpensive to produce, simple and trouble-free in operation and applicable for use with new or existing container-conveying machinery.

Other objects and features of the invention are to provide a novel code-marking machine with a novel effective ink transfer system for inking a quick copy change print head or code applying head with fast drying, flexographic types of inks, and for readily changing the color and character of the ink utilized as may be desirable.

Other objects and features of the invention are to provide a code-marking machine of the character described, in which the code-markings are applied with great clarity and without blurring to the container surfaces, means being provided to grip the container firmly during application of the marks thereto and to provide a surface speed to the surface on the container on which the mark is being applied that is synchronous with the surface speed of the mark-applying element during application of the mark thereby.

Other objects and features of the invention will become apparent from the following specification and accompanying drawings, wherein.

Figures 6, 7, 7A, 8:
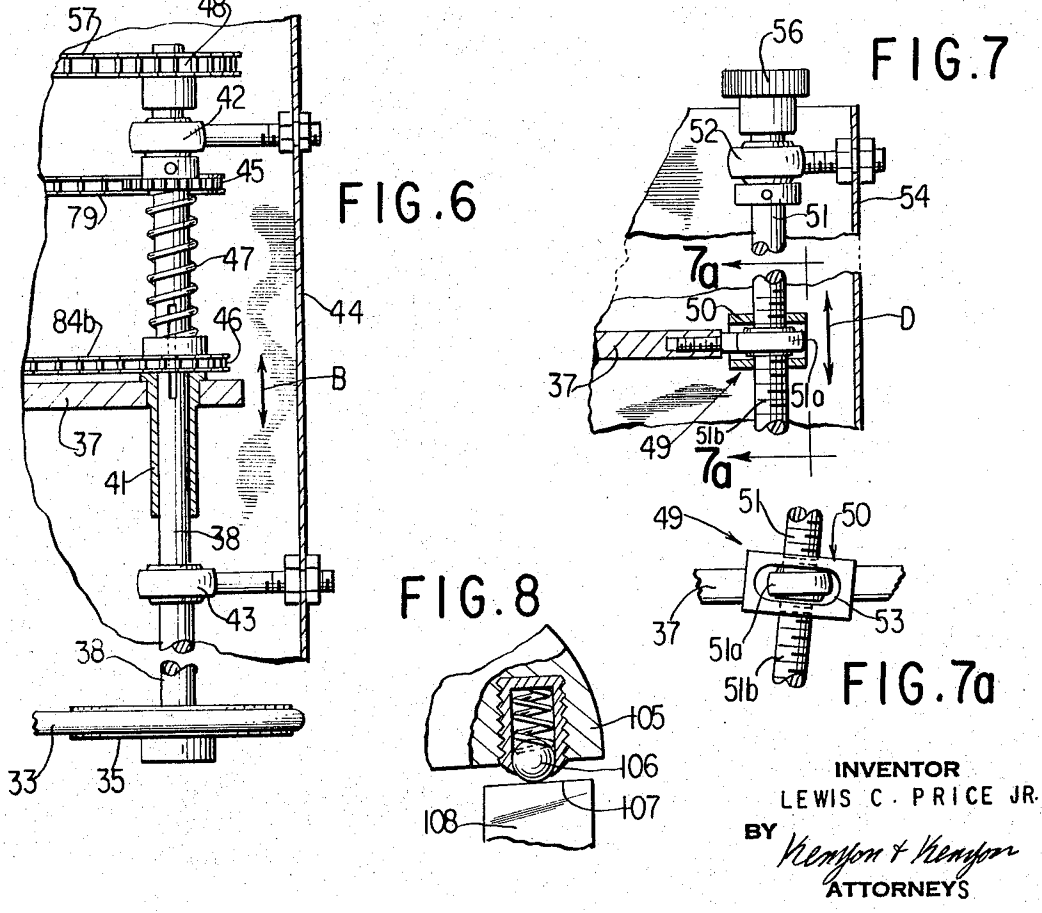
FIGURE 6 is a sectional view taken along line 6—6 of FIGURE 5 also seen in the direction of the arrows.
FIGURE 7 is a sectional view taken along line 7—7 of FIGURE 5 also seen in the direction of the arrows.

FIGURE 7*a* is an enlarged fragmentary view of a detail of FIGURE 7.

Figures 1, 2:
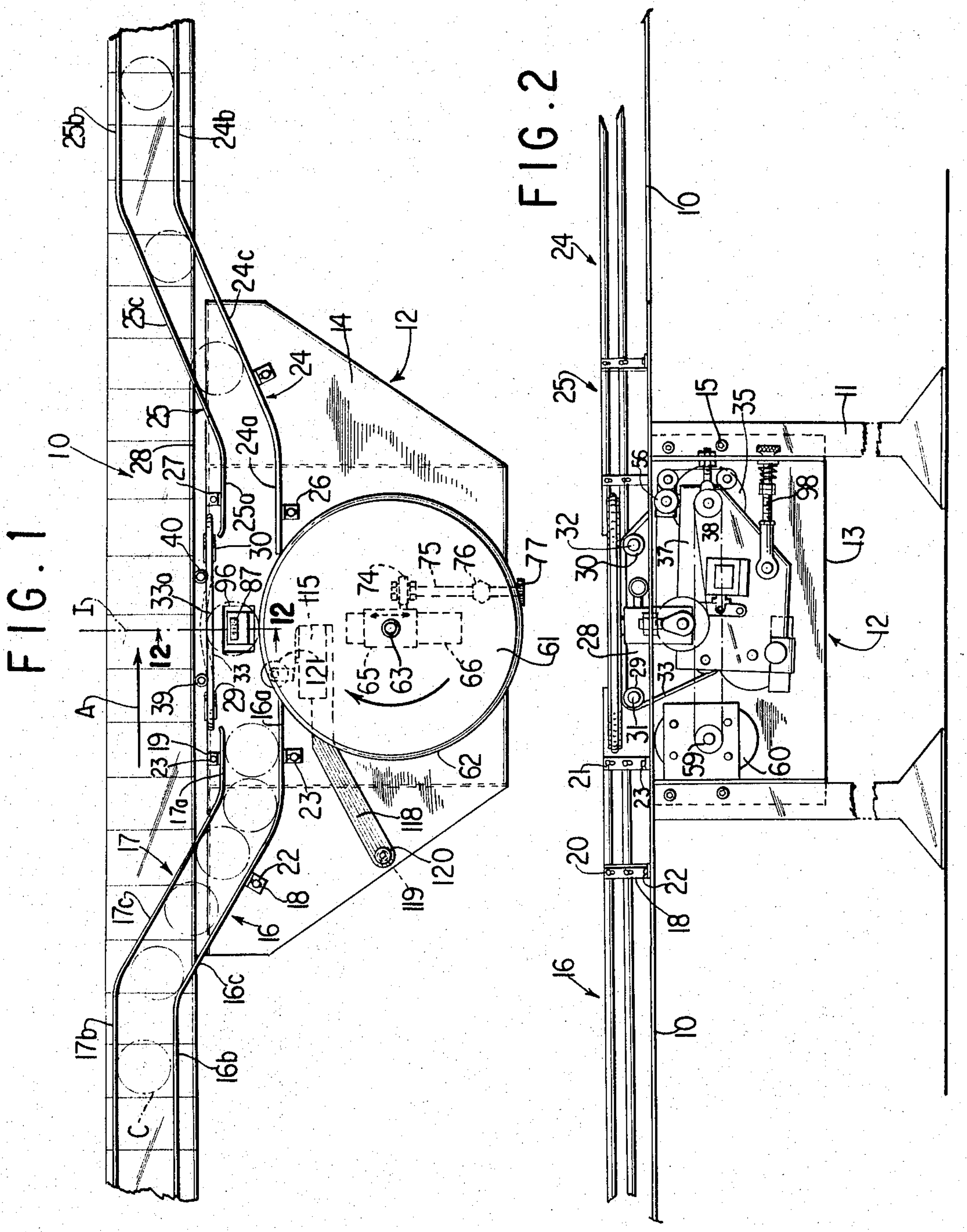
FIGURE 1 is a plan view of a code-marking machine embodying the invention as mounted adjacent a moving conveyor of a container-treating machinery of any general type.
FIGURE 2 is an elevational view of the machine of FIGURE 1.
Figure 3:
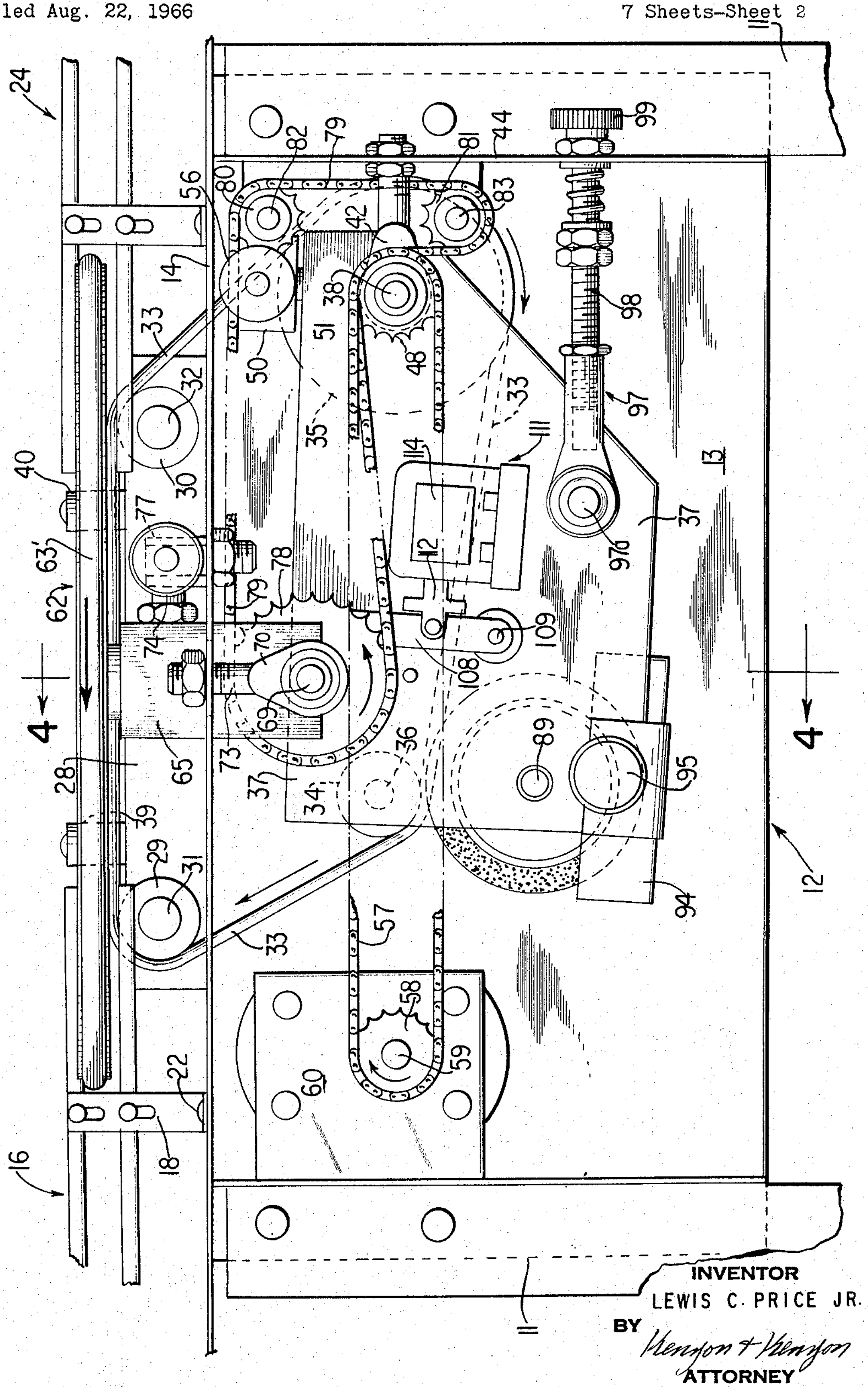
FIGURE 3 is a view similar to that of FIGURE 2 on an enlarged scale.
Figure 4:
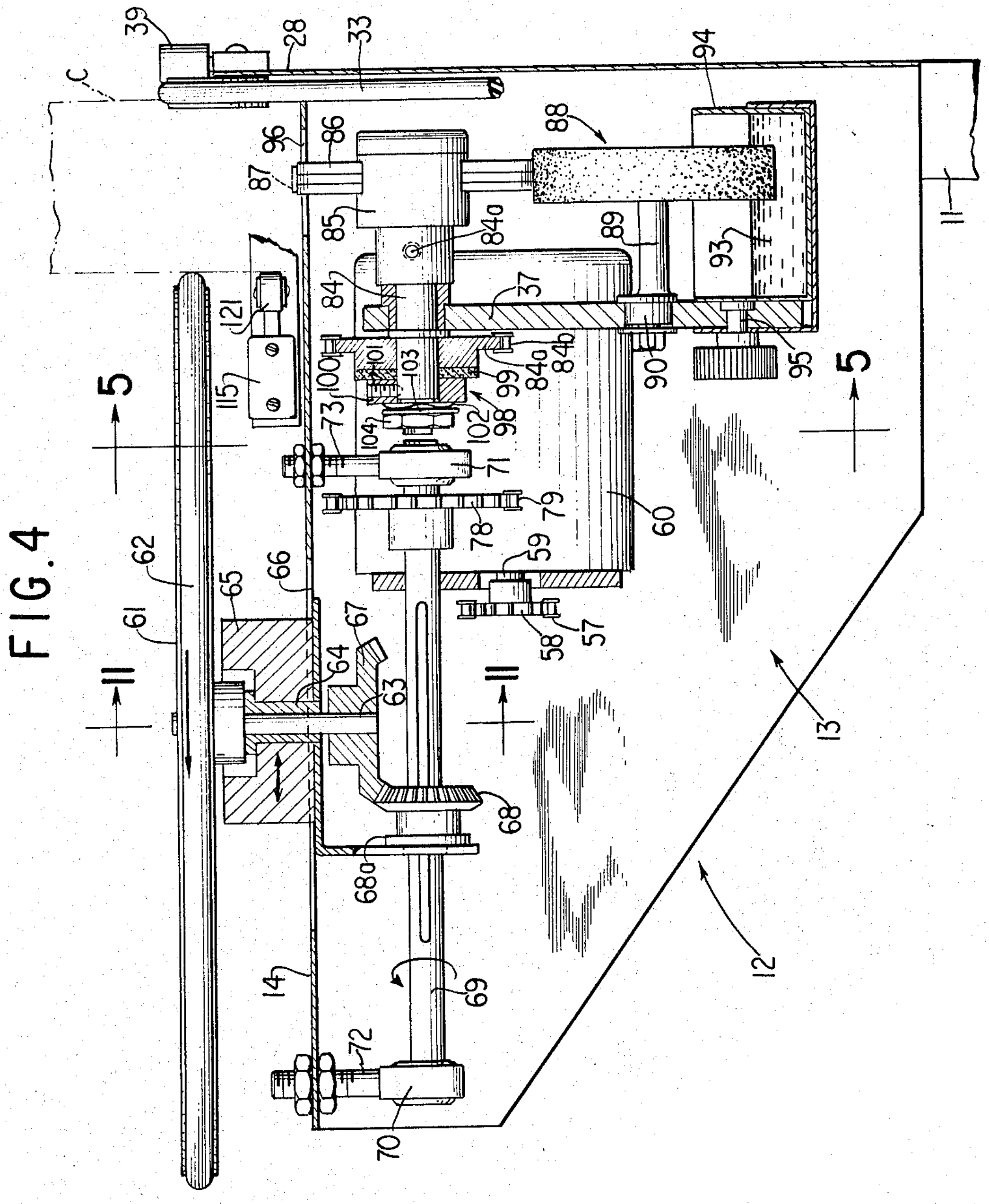
FIGURE 4 is a sectional view taken along line 4—4 of FIGURE 3 and seen in the direction of the arrows.
Figure 13:
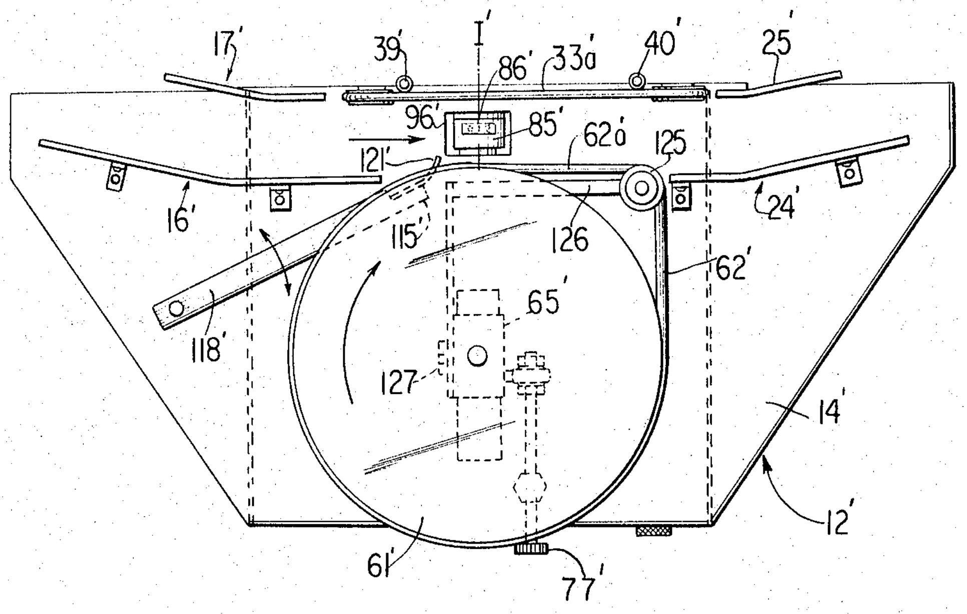
Figure 14:
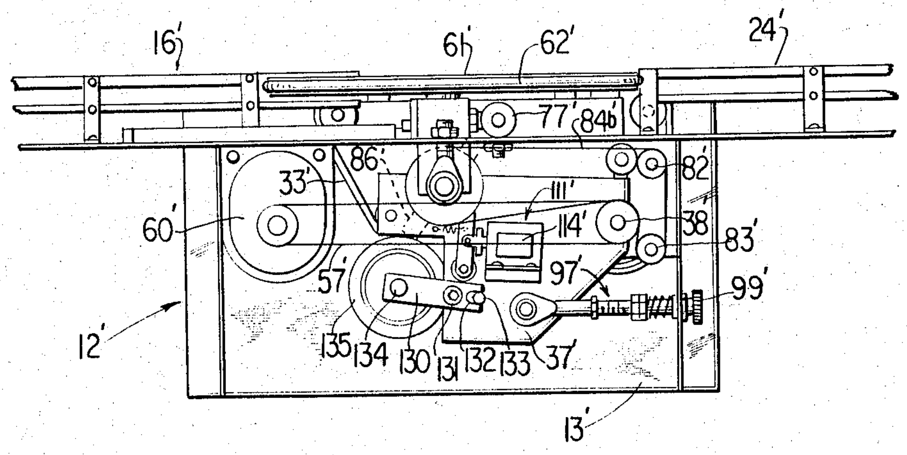
Figure 15:
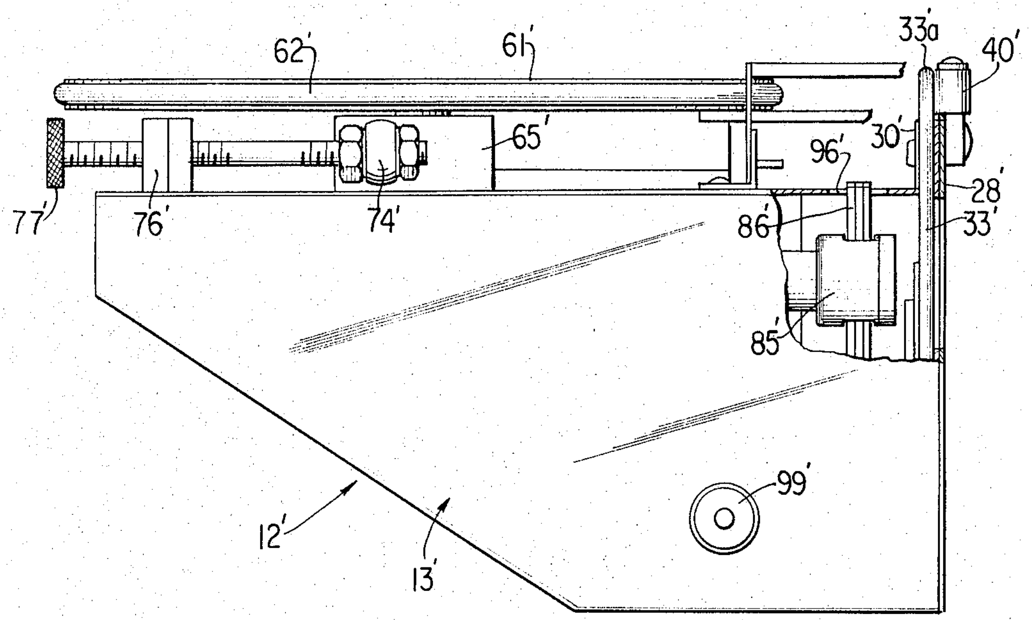

FIGURE 8 is a fragmentary partially broken away view of a mechanical detail;

FIGURE 9 is a perspective view of an inking mechanism for the machine of this invention;

FIGURE 10 is a fragmentary section taken along line 10—10 of FIGURE 9 seen in the direction of the arrows;

FIGURE 11 is a fragmentary sectional view taken along line 11—11 of FIGURE 4 also seen in the direction of the arrows;

FIGURE 12 is a fragmentary sectional view taken along line 12—12 of FIGURE 1;

FIGURE 13 is a top plan view of a modified form of code-marking machine embodying the invention;

FIGURE 14 is a front elevational view of the machine of FIGURE 13;

FIGURE 15 is a side elevation of said machine, and

Figure 16:
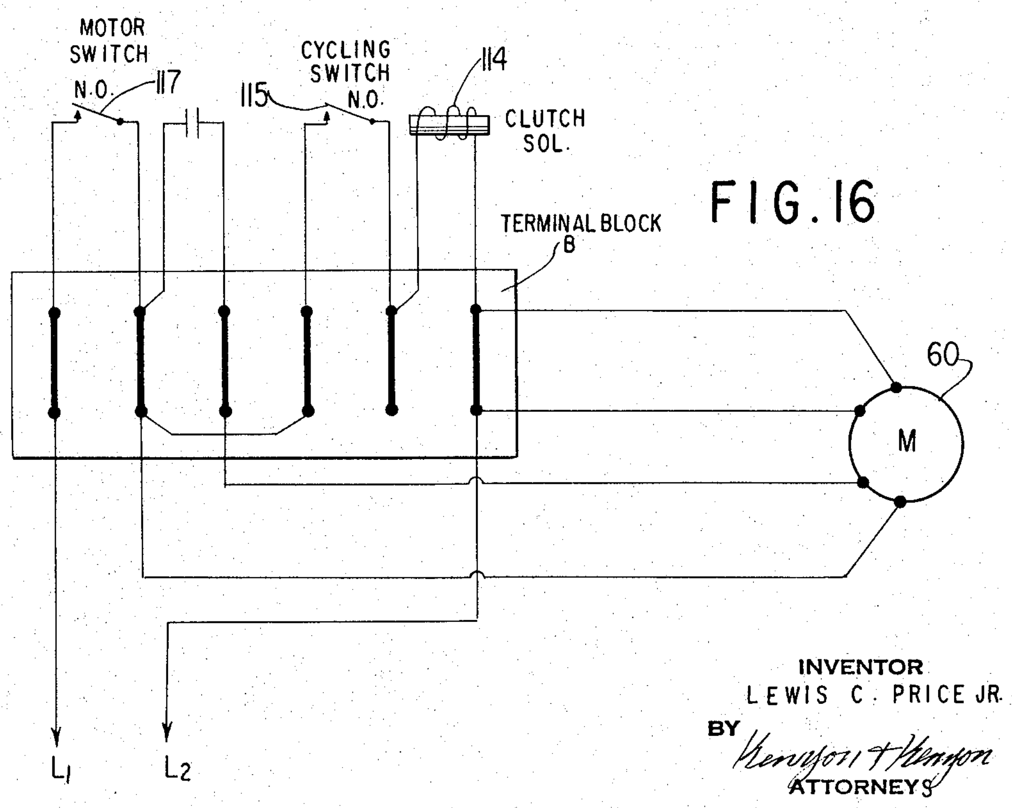

FIGURE 16 is a schematic diagram of the electric circuit for controlling the operation of the machine embodying this invention.

Referring to the drawings, and first to FIGURES 1–4, the reference character 10 denotes the upper flight of a conveyor movable in direction of arrow A of any common type of container-treating machinery on which containers C intended to have code-markings applied to their bottom faces are borne and which conveyor is appropriately carried by said machinery. The leg supports 11 of said machinery are utilized conveniently to support the code-marking machine 12 of this invention alongside said conveyor 10. The code-marking machine may also be bolted to the side of the conveyor by bolts 15.

The code-marking machine 12 comprises an enveloping frame 13 having a table-like top surface 14 which is adapted when the frame 13 is mounted on leg supports 11 as by bolts 15, to lie substantially at the same level as that of said conveyor flight 10, and laterally to one side of the latter with the front edge of table top 14 parallel thereto.

A pair of parallelly disposed, spaced-apart lead-in guide rails 16 and 17 are mounted on the table surface 14 as by angle brackets 18 and 19. These guide rails have portions 16*a* and 17*a* overlying the table surface 14 extending parallelly with the direction of motion of conveyor flight 10, and second portions 16*b*, 17*b*, displaced laterally relative to portions 16*a* and 17*a* and overlying said conveyor flight 10, and sloping portions 16*c*, 17*c*, joining the respective portions 16*a*, 16*b* and 17*a*, 17*b*. Thus the guide rails 16 and 17 serve to divert the oncoming containers C from the conveyor flight 10 onto the table surface 14 so that they may be successively delivered to the code-marking position I of the machine 12.

The guide rail supporting angle brackets 18 of guide rail 16 and also guide rail 19 of guide rail 17 are slotted in their horizontal legs to permit changes of spacing between the guide rails 16 and 17 to accomodate containers of differing dimensions, said guide rails being secured to the vertical legs of said brackets 18 and 19 as by cap screws 20 and 21 and said brackets being secured to said table surface 14 as by cap screws 22 and 23 or in other equivalent ways. Similar slotting may be provided in the vertical legs of the brackets to permit changes of elevation of the guide rails.

A second pair of parallelly-disposed, spaced-apart exit guide rails 24, 25 are also mounted on the table surface 14 as by angle brackets 26, 27. These guide rails 24 and 25 have portions 24*a*, 25*a* axially overlying the table surface 14 and aligned with guide rail portions 16*a*, 17*a*, the second portions 24*b*, 25*b* displaced laterally relative to portions 24*a*, 25*a* and axially aligned with guide rail portions 16*b*, 17*b* and overlying the conveyor flight 10, and sloping portions 24*c*, 25*c*, joining the respective portions 24*a*, 25*a*, and 24*b*, 25*b*. The guide rails 24 and 25 are adjustably supported by the said brackets 26 and 27 to facilitate changes in elevation and spacing between guide rails 24 and 25 in the same manner and for the same reasons as guide rails 16 and 17.

The facing ends of guide rail portions 16*a* and 17*a* and 24*a* and 25*a* overlying table surface 14 are separated from each other to provide the code-marking position I of said machine 12. The guide rails 24 and 25 serve to return the containers to the conveyor flight 10 after code-markings have been applied at the code-marking position I.

A vertically extending flange 28 (FIG. 3) is provided at the front edge of table surface 14 between it and the adjacent parallel edge of the conveyor flight 10 substantially opposite the code-marking position I. Spaced-apart pulley wheels 29 and 30 are supported on horizontal stub shafts 31 and 32 mounted on flange 28. A flexible endless frictional drive belt 33 preferably of circular cross-section is passed around the pulley wheels 29 and 30 as well as an idler pulley wheel 34 and a drive pulley 35 supported internally of the casing 13. The upper flight 33*a* of belt 33 lies above the surface of table top 14. The supporting shaft 36 of pulley wheel 34 is suitably mounted internally of casing 13.

A swivel plate 37 is mounted internally of said casing 13, and the supporting shaft 38 for said drive pulley 35 extends through said swivel plate. Guide rollers 39 and 40 in surface contact with the upper flight 33*a* of drive belt 33 are vertically supported from the upper edge of flange 28 at positions intermediate the pulley wheels 29 and 30 to limit lateral displacement of the upper flight 33*a* of the drive belt 33 by the containers C at code-marking position I that occurs during use as will be described.

Figure 5:
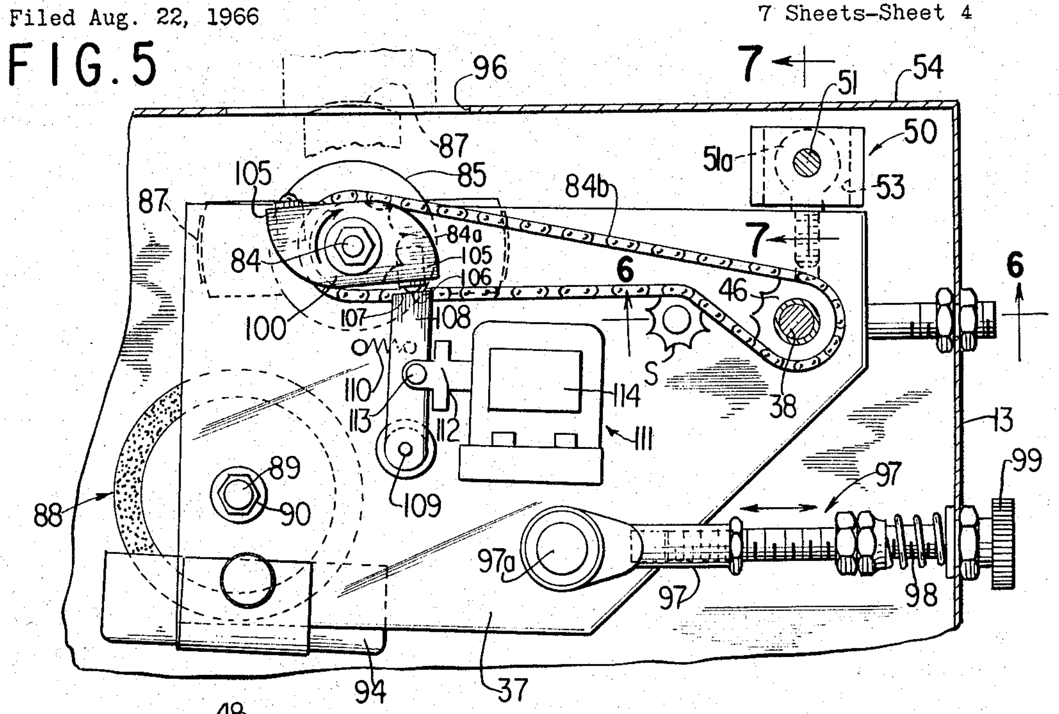
FIGURE 5 is a sectional view taken along line 5—5 of FIGURE 4 also seen in the direction of the arrows.

The swivel plate 37, as seen in FIGURES 5, 6 and 7, is mounted on a sleeve 41 carried slidably on the drive shaft 38. This drive shaft 38 in turn is supported for rotation by the respective bearings 42, 43 fixedly carried by an apron portion 44 of casing 13. A chain sprocket wheel 45 is fixed to shaft 38 and a second chain sprocket wheel 46 is slidably keyed on shaft 38 adjacent sleeve 41. A biasing spring 47 on shaft 38 between the two sprocket wheels 45 and 46 biases them apart. A third sprocket wheel 48 is also fixedly mounted on drive shaft 38. The drive pulley 35 is also fixed to the shaft 38. Hence when shaft 38 is driven by powered rotation of sprocket wheel 48 as will be described the sprocket wheels 45 and 46 as well as pulley 35 are all driven to supply required motive power to various parts of the machine as will be described.

Limited adjustable swiveling motion of the swivel plate 37 on the axis of shaft 38 is desired. This is provided by threaded floating retainer 49 (FIGS. 7 and 7*a*) comprising a floating portion 50 and a spherical end bearing 51*a* fastened to plate 37. A rod 51 passes through the threaded floating retainer slot 53. The swivel plate 37 is also shiftable transverse of the axis of shaft 38. To this end the rod 51 is mounted rotatably in a spherical upper bearing 52, carried by side wall 54 of said frame 13. The rod 51 extends through the threaded floating retainer slot 53. The threaded portion 51*b* of rod 51 engages the threaded floating retainer 49. FIGURE 7*a* shows the rod 51 and threaded floating retainer 49 in a somewhat exaggerated relationship.

A manipulating knob 56 is secured to one end of rod 51 whose rotation causes spherical end bearing 51*a* to shift the plane of swivel plate 37 as indicated by the arrows B and D in FIGURES 6 and 7 toward and away from the front edge of surface, the purpose of which shiftability will be presently described.

A sprocket chain 57 serves to couple sprocket 48 on shaft 38 to sprocket 58 mounted on the output shaft 59 of an electric motor 60 (FIGURES 2 and 4) which is conveniently secured to the frame 13 below the underface of table surface 14. Thus, operation of motor 60 as will be described serves to drive shaft 38 and consequently drive sprocket wheels 45 and 46 as well as drive pulley 35 of the flexible drive belt 33.

A horizontally disposed drive disc or plate 61 bearing a friction ring 62 on its peripheral surface is supported above the table surface 14 for rotation by a driven shaft 63. This shaft 63 (FIGS. 4 and 11) extends vertically through a bearing 64 carried by a bearing block 65 which latter is shouldered at 65*a* and engaged by edges defining a gap 66 in the table surface 14 so as to be laterally movable in said gap toward and way from said drive belt 33. The shaft 63 carries a bevel gear 67 at its inner end. This bevel gear 67 in turn meshes with a bevel gear 68 slidably keyed on a rotary, horizontally disposed shaft 69 which is supported for rotation by commercial spherical end bearings 70 and 71 supported by their respective rod ends 72, 73 from the table surface 14. The block 65 is secured to spherical end bearings 74 extending laterally therefrom and carries a rotatable bolt 75 (FIG. 1) which is horizontally disposed and threaded through a fixed nut 76 supported by the table surface 14 below disc 61. A manipulating knob 77 on the outer end of bolt 75 permits guided adjustment of the bearing block 65 and with it shaft 63 and rotatable disc 61 toward and way from the upper flight 33*a* of the driven belt 33 to accommodate differently dimensioned containers C. The bevel gear 68 is mechanically coupled to block 65 in any suitable way at 68*a* so that a block 65 is shifted by operation of knob 77 the gear 68 will slide along shaft 69 remaining in mesh with gear 67.

Shaft 69 carries a sprocket wheel 78 (FIGS. 3 and 4), keyed thereto. A sprocket chain 79 passing around sprocket wheel 78 engages sprocket wheel 45 on shaft 38 and also passes around a pair of spaced-apart idler sprocket wheels 80 and 81 which are rotatively supported on stud shafts 82 and 83 mounted on the frame 13. Thus when shfat 38 is driven by motor 60 as described, the shaft 69 is rotated and disc 61 is also rotated.

The swivel plate 37 rotatively carries a marking head assembly drive shaft 84 (FIG. 4) disposed in horizontal direction below the table surface 14 to which a marking head carrier 85 is keyed by means of a set screw 84*a*. This marking head carrier 85 is preferably of the type described in my co-pending application Ser. No. 522,427 on which one or more removable and replaceable resiliently supported radially disposed marking heads 86 are borne. Each head 86 at its radially outermost end bears a mark-applying element 87 having type legends or other code-markings which it is desired to apply to bottom faces of successive containers. The mark-applying elements 87 are adapted to be inked by tangential contact with the periphery of an ink transfer roller 88 which is rotatively supported on a stub shaft 89 secured at 90 to the swivel plate 37 and which is rotated by the periodic motion of its contact with mark-applying elements 87. The portion 90 of the stub shaft 89 is in the form of an eccentric, whereby the ink transfer roller 88 may be adjusted to regulate the contact pressure between the inking roller 88 and the mark-applying head 86, thus making certain a satisfactory deposit of ink is transferred thereto. This ink transfer roller 88 (FIGS. 4, 9 and 10) comprises a wheel 91 of metal or the like on which an outer porous filter ring 92 is mounted which is adapted to rotate in an ink bath 93 carried by an ink container 94 which is removably clamped at 95 to the swivel plate 37 so that said ring 92 dips into the bath and absorbs and carries ink from the bath 93 for application by tangential contact to the mark-applying elements 87 of the heads 86. Excess ink drains back to the container 94 along the surface of ring 92 and via its pores. Table surface 14 is slotted at 96 at the mark-applying station I so that during driven rotation of shaft 84 and head 85, the successive outer ends of heads 86 will project upwardly through the slot 96 to a level sufficient to press their respective inked mark-applying elements 87 against the bottom faces of successive containers C passing through the marking station I.

The extent of upward projection of the outer ends of heads 86 through slot 96 in the table surface 14 above the latter is adjustable by pivotal swing of swivel plate 37 about the axis of shaft 38 within the limits of the movement of the rod 51 within the threaded floating retainer 49 (FIGS. 5, 7 and 7*a*). This adjustment of swivel plate 37 is effected by an extendable link 97 pivotally joined at one end by a spherical bearing **97*a* to the swivel plate 37 and including a threaded screw 98 with manipulating knob 99 in fixed relationship to frame 13 so that rotation of knob 99 will effect longitudinal extension or retraction of link 97 and thus provide corresponding swiveling action of swivel plate 37 about shaft 38, thus elevating or lowering the axis of shaft 84. Thus, the adaptability of the swivel plate 37 makes it possible to apply code-markings to containers where bottoms are at various depths from the lower ends of the containers as well as the containers having concave bottom faces, it being merely necessary to manipulate knob 99 and shift the angle of the swivel plate 37. Shift of the plane of swivel plate 37 on the axis of shaft 38 by manipulation of knob 56 as previously described also permits adjustment of the location of the code imprints applied by the mark-applying elements 87**.

Intermittent cyclic 180° step drive of shaft 84 carrying the marking head carrier 85 is effected through a slip-clutch mechanism 98 associated with shaft 84, and a sprocket wheel **84*a* which is rotatively borne on said shaft. This sprocket wheel 84*a* is connected to sprocket wheel 46 on shaft 38 by sprocket chain 84*b* also passing over an idler sprocket S. The wheel 84*a* has a friction disk 99 secured to one face thereof against which a face of a ratchet wheel 100 keyed to shaft 84 as by set screw 101 is biased by a spring 102, washer 103 and clamping nut 104 screwed on the inner end of shaft 84. The ratchet wheel 100 has a pair of radially extending ratchet teeth 105 (FIG. 5), each provided on a plane radial face with spring biased contact ball 106 (FIGS. 5 and 8) each engageable with the free end surface 107 of a pawl lever 108 which is pivotally secured at 109 to the swivel plate 37. This awl lever 108 is normally biased by a spring 110 to maintain its end surface 107 in the path of travel of the ball 106 of a ratchet tooth 105 and thus normally prevent rotation of ratchet wheel 100 and thus also prevent rotation of the shaft 84 and the marking head carrier 85, the normal disposition of marking heads 87 then being such as to both lie below the slot 96 of the table surface 14**.

In order to provide intermittent cyclic release of ratchet wheel 100, an electromagnet 111 mounted on swivel plate 37 has its movable armature 112 pivotally coupled at 113 to the pawl lever 108 so that the retraction of armature

112 effected by energization of the coil 114 of the electromagnet 111 will swing the pawl lever 108 about its pivot 109 sufficiently to move its free end 107 out of the rotary path of travel of the ratchet teeth 106 and permit the ratchet wheel to be driven frictionally by friction disc 99 and driven sprocket **84*a* to thus rotate the drive shaft 84 and marking head carrier 85 and printing heads 87 from driven shaft 38. However, such energization of coil 114 is only momentary, being long enough to clear the pawl lever 108 from a particular ratchet tooth 105 to permit a 180° rotation of the drive shaft 84. The coil is deenergized before the next ratchet tooth 105 comes into position to be intercepted by the end 107 of pawl lever 108 which latter is restored to an intercepting position by the spring 110 promptly upon deenergization of coil 114**.

In order to provide for intermittent cyclic energization and deenergization of coil 114, the latter as seen in FIGURE 16 has one end connected to a movable pole of normally open cycling switch 115. The fixed pole of this switch 115 is appropriately connected via a terminal block B through a normally open motor switch 117 to one of the power supply lines $L_1$. The other end of solenoid coil 114 is directly connected through the terminal block B to the other power supply line $L_2$. The motor switch 117 is also connected via the terminal block B to the leads of drive motor 60 of the machine. As seen from FIGURE 16, the motor switch 117 and the cycling switch 115 are so interconnected that the motor switch 117 must first be closed before any power can be delivered to the solenoid coil 114 by cyclic closure of the cycling switch 115.

As seen in FIGURE 1, the normally open cycling switch 115 is mounted on an angularly adjustable arm 118 carried by the table top 14 at a pivot point 119. A suitable lock nut or the like 120 serves to fix the arm 118 in any adjusted angular position so that the yieldable operating member 121 of the cycling switch 115 lies in the path of travel of the containers C which are being moved toward the mark-applying position I between guides 16 and 17. Thus, this operating member 121 will be displaced to momentarily close the normally open cycling switch 115 each time a container C passes it in its traverse to the mark-applying position I.

The successive containers C which are diverted from the conveyor flight 10 by the guides 16 and 17 are jamfed forwardly between the guides 16 and 17 towards the mark-applying position I by containers coming up from behind them because of the motion of the conveyor flight 10, and each succeeding leading container C before it arrives at the marking station I is engaged and gripped individually between the flight **33*a* of driven belt 33 and the friction ring 62 of driven disc or plate 61 whose surface speeds are synchronous. As a result, the gripped container C is positively advanced toward and through the marking position I, its bottom passing over the slot 96 in the table surface 14 at said position I. During this gripped advance of the leading container C, it engages the cycling switch operating member 121 and momentarily closes the cycling switch 115 and causes momentary energization of solenoid coil 114. This trips the slip clutch mechanism 98 and causes a 180° rotation of the marking head carrier 85 so that one of the mark-applying elements 87 of one of its heads 86 is rotated and imprints its mark on the bottom of said leading container by upward projection through slot 96 of the table surface 14 as the container passes over said slot. The surface speed of the imprinting mark-applying head during this imprinting operation is synchronous with the speed of movement of the gripped container C passing through the marking position I. This synchronous speed is effected by correlation of the rotary speed of its drive shaft 84 to the rotary speed of disc 61 and feeding speed of the drive belt 33 through the hereinabove described gears and sprocket chain drives and speed ratios of the driving and driven elements as is well understood, all of which derive their motive power from the motor 60 through shaft 38**.

Because of the synchronous speed of movement of the bottom surface of the container and the surface speed of the respective mark-applying elements 87 during the imprinting operation thereof, no blurring is possible and a clear undistorted imprint is applied to the bottom face of the container passing through the mark-applying station I.

The positive gripping of the successive containers between the drive belt flight 33a and the friction ring 62 during feed of the successive containers through the marking station I prevents displacement of the containers during actual application of the imprint or code-mark thereto. Moreover, the upper flight 33a of the drive belt 33 is given a downward cant in its feeding directions as seen in FIG. 12 in an exaggerated scale as lower elevation of pulley 30 relative to pulley 29. As a result, during the gripped feed of the containers through the marking position I, the belt flight 33a also tends to urge the gripped container firmly downwardly onto the top of table surface 14 and resists any tendency to upward displacement of this container as it is having a code-mark applied thereto. This further assures clarity of the applied code-mark.

It is understood, of course, that each described cyclic rotary 180° movement of the printing head carrier 85 carries each successive mark applying element 87 thereof into contact with the inking ring 92 so that ink is applied to such element 87 in advance of its imprinting contact with a container bottom.

It is to be noted that the upper flight 33a of the drive belt 33 yields somewhat laterally while the container is gripped between it and the friction ring 62 of disc 61. However, the extent of this yield is limited by the idler guide rolls 39 and 40 and this enhances a firm feeding grip on each container as it is fed and passes through the marking position I.

After each code-marked container C leaves the marking position I, it passes out from gripped feeding relationship between belt flight 33a and the friction surface 62 and enters between the positions 24a and 25a of the exit guides 24 and 25. It is subsequently pushed by following succeeding marked containers through the sloping portions 24c and 25c and conveyor flight overlying portions 24b and 25b back onto the conveyor flight 10 which then resumes conveyance of the code-marked containers for any needed subsequent operations.

In the modified form of code-marking machine shown in FIGURES 13 to 15 inclusive, the general features of construction and principles of operation described with respect to the first embodiment are substantially the same. All reference characters therein identical with those of FIGURES 1–12 but which are primed refer to identical parts and their description is not herein repeated.

The major changes in this second modification are primarily in connection with the gripped feed of the successive containers between the flight 33'a of the drive belt 33' and the drive disc 61'. To this end, the friction surface 62', in the form of a belt instead of extending solely around the periphery of disc 61', also is passed around on idler pulley 125, thus providing a flight portion 62'a which extends parallelly with the flight 33'a of drive belt 33' beyond the marking position I', to the entrance to the exit guides 24', 25'. These parallel flight portions 33'a and 62'a thus maintain a positive gripping action on the containers well beyond the marking position I' and insure positive removal of the marked container from said position, thus precluding any possibility of retarding and double imprinting on the next container at the marking position I'.

The idler pulley 125 around which the friction belt 62' is threaded is supported for rotation on a bracket 126 which is secured at 127 to the bearing block 65'. Thus, guided adjustment of bearing block 65' by the manipulating knob 77', which serves the same function as knob 77 of the first modification, provides identical shift of disc 61' and flight 62' of its friction belt toward or away from flight 35'a for differently dimensioned containers.

The second feature of difference is elimination of the ink transfer roller 88 and its ink bath 93 and ink container or reservoir 94 and the substitution of a different inking arrangement therefor. To this end, the swivel plate 37' as seen in FIG. 14 has a bracket arm 130 pivotally supported at 131 therefrom. This arm is forked at 132 to engage an eccentric adjustment member 133 so that the angular disposition of bracket arm 130 may be adjusted as desired. A stub shaft 134 is mounted adjacent the opposite end of arm 130 onto which a permanently inked roller 135 is removably mounted. The location of arm 130 is such that the peripheral surface of roller 135 will be successively engaged by the mark-applying elements of the successive marking heads 86' during their cyclic rotation for application of a code-mark to a container bottom at the marking position I' of the machine. The eccentric adjustment member 133 in the fork 132 of bracket arm 130 makes it possible to regulate the pressure of contact between the inking roller 135 and the mark-applying elements of the marking head 86' and thus insure that a satisfactory amount of ink is transferred thereto.

The inking roller 135 is of a type that retains its ink for a relatively long time and the entire roller 135 may be removed and replaced by a fresh roller whenever necessary, or else, a new roller with differently colored ink substituted whenever desirable. Its use eliminates the need for an ink bath or reservoir-like ink bath 93 and reservoir 94 of the first modification. This avoids danger of ink spillage or necessity for frequent filling or cleaning of the ink reservoir.

The operation of both described modifications are identical.

The containers C travelling on the conveyor flights are diverted therefrom by the entrance guides 16, 17 or 16', 17' and jam-fed in the latter toward the marking positions I or I' on table top 14 or 14'. As they approach the latter, they are successively gripped between flights 33a or 33'a of drive belts 33 or 33' and the friction surface 62 or driven belt 62' of discs 61 or 61' and moved toward the marking positions I or I'. In such motion, each gripped container engages the cyclic switch control element 121 or 121' of the normally open cyclic switch 115 or 115' causing cyclic release of the respective slip clutch mechanisms by energization of the respective coils 114 or 114' of their electromagnets 111, 111' as described and a 180° imprinting revolution of the marking head carrier 85 or 85'. This causes the mark-applying element of head 86 or 86' to imprint the desired code-mark on the container bottom passing over the marking station I or I' and then to rotate out of engagement with said bottom at which time the slip clutch mechanism again stops rotation of the marking head carrier. The imprinted container is then moved away from the marking station I or I' by combined action of the flights 33a or 33'a of the drive belts 33 or 33' and friction surface 62 or flight 62'a of driven belt 62' of respective driven discs 61 or 61'. Thereafter such containers are guided and jam-fed and returned via exit guides 24, 25 or 24', 25' to the conveyor for delivery to a desired location or subsequent treatment.

While specific embodiments of the invention have been described, variations in structural detail within the scope of the appended claims are possible and are contemplated. There is no intention, therefore, of limitation to the exact details herein presented.

What is claimed is:

1. Apparatus for applying markings to container bottoms as the containers are moved along by a conveyor comprising a casing having a table surface independently mountable to said apparatus alongside the conveyor, guide means for diverting the containers from the conveyor over the table surface to a mark-applying position thereon and for subsequently returning the containers to the conveyor beyond said mark-applying position, independent driving means in said casing, driven means carried by said casing and operated by said independent driving means for gripping and diverted containers successively and positively moving them toward and beyond the mark-applying position, rotary mark-applying means at the mark-applying position for applying a mark to the bottom of each successive container as it moves through the mark-applying position, cyclic means controlled by motion of the successive containers through said guide means to said mark-applying position to provide cyclic intermittent rotation of the mark-applying means so that only one marking will be applied to each successive container, and common driving means for effecting synchronous speed of movement of the bottom surface of each successive container and the mrak-applying means during application of the mark to such surface to insure clarity of the applied mark, said driven gripping means include a driven belt having a downwardly biased upper flight in direction of motion toward the mark-applying position engageable with a side of the containers to prevent displacement of the successive containers during actual application of markings to the containers, and a driven rotary disc member having a friction surface spaced from said driven belt also engageable with said side of said containers at a location opposite to the engagement thereof by said driven belt.

2. Apparatus according to claim 1, including means for adjusting the spacing between said rotary disc member and said driven belt.

3. Apparatus according to claim 1 wherein said friction surface includes a driven belt member having a flight portion extending substantially parallel with said first-named driven belt and which is moved at synchronous speed therewith.

4. Apparatus according to claim 1, including a swivel plate mounted in said casing below said table surface for swiveling adjustability on an axis extending substantially parallel with said table surface, means for adjustably swiveling said swivel plate on sad axis, and means for adjustably shifting said swivel plate along said axis toward and away from said conveyor, said swivel plate carrying said rotary mark-applying means, and said cyclic means including slip-clutch means carried on said swivel plate for providing cyclic rotation of said mark-applying means.

5. Apparatus according to claim 4 including electromagnetic means mounted on said swivel plate for operating said slip-clutch means, and said cyclic means also including an electric circuit and switching means connected to said electromagnetic means for energization and deenergization of said electromagnetic means by successive containers as they are moved in said apparatus.

6. Apparatus according to claim 1, including a swivel plate carrying said rotary mark-applying means, said rotary mark-applying means including a mark-applying element rotatable cyclically upwardly of said table surface for engaging and applying a mark to the bottom surface of each successive container at the mark-applying position, and inking means carried by said swivel plate for inking the mark-applying element in advance of its engagement with each bottom surface.

7. Apparatus according to claim 6, wherein said inking means includes an ink reservoir and an ink transfer roller that receives ink from said reservoir.

8. Apparatus according to claim 6, wherein said inking means includes a removable ink-retaining roller preloaded with ink.

9. Apparatus according to claim 1, including a swivel plate, a rotary shaft mounted on said swivel plate, said rotary mark-applying means being carried by said shaft, a driven sprocket wheel rotatably mounted on said shaft, a pawl member secured to said rotary shaft, slip friction means coupling said driven sprocket wheel and said pawl member, a ratchet member normally engaging said pawl member and blocking its rotation, electromagnetic means connected to said ratchet member for cyclically releasing said pawl member, said cyclic means also including an electric circuit and switching means connected to said electromagnetic means for alternate energization and deenergization of said electromagnetic means by successive containers in advance of their arrival at said mark-applying position, and means for driving said sprocket wheel from said common driving means.

10. Apparatus according to claim 1 in which said rotary mark-applying means comprises a carrier head, marking heads extending radially from said head and a mark-applying element on the radially outward end of each marking head.

11. Apparatus according to claim 1, including a swivel plate mounted in said casing below said table surface on an axis substantially parallel with said table surface, means for adjustably swiveling said swivel plate on said axis, and means for limiting the extent of swivel of said swivel plate, said rotary mark-applying means being carried by said swivel plate.

12. Apparatus according to claim 11, including means for adjustably shifting said swivel plate along said axis.

13. Apparatus according to claim 1, including a swivel plate mounted in said casing below said table surface, said rotary mark-applying means being carried by said swivel plate, and said cylic means including electromagnetically operated slip-clutch means for controlling rotation of said rotary mark-applying means.

References Cited

UNITED STATES PATENTS

| | | | |
|---|---|---|---|
| 410,155 | 9/1889 | Dean et al. | 101—219 XR |
| 2,195,173 | 3/1940 | Jackson | 101—35 |
| 2,679,313 | 5/1954 | Gueffroy et al. | 198—165 XR |
| 3,026,797 | 3/1962 | Gottscho | 101—228 |
| 3,074,533 | 1/1963 | Ninnerman et al. | 198—165 |
| 3,176,609 | 4/1965 | Steckling | 101—35 |
| 3,220,531 | 11/1965 | Higonnet et al. | 197—84.1 |
| 3,274,927 | 9/1966 | Lusher et al. | 101—40 |

ROBERT E. PULFREY, *Primary Examiner.*

H. DINITZ, *Assistant Examiner.*